United States Patent
Abiko

(10) Patent No.: US 6,788,694 B1
(45) Date of Patent: Sep. 7, 2004

(54) DIAL-UP ROUTER AND METHOD OF CONTROLLING OUTGOING OF THE DIAL-UP ROUTER

(75) Inventor: Yoshinori Abiko, Tokyo (JP)

(73) Assignee: NEC Corporation, Tokyo (JP)

(*) Notice: Subject to any disclaimer, the term of this patent is extended or adjusted under 35 U.S.C. 154(b) by 813 days.

(21) Appl. No.: 09/604,800

(22) Filed: Jun. 28, 2000

(30) Foreign Application Priority Data

Jun. 28, 1999 (JP) .......................................... 11-181051

(51) Int. Cl.[7] .............................................. H04L 12/28
(52) U.S. Cl. ..................................... 370/401; 370/351
(58) Field of Search .............................. 370/229, 230, 370/232–236, 252, 253, 305, 401, 402

(56) References Cited

U.S. PATENT DOCUMENTS 5,337,311 A * 8/1994 Herzberg et al. ............ 370/403
5,367,534 A * 11/1994 Chou et al. ..................... 375/8

* cited by examiner

*Primary Examiner*—Wellington Chin
*Assistant Examiner*—Brenda Pham
(74) *Attorney, Agent, or Firm*—Foley and Lardner LLP

(57) ABSTRACT

When receiving data to be transmitted from LAN 4 to WAN 5, operation information showing that operation has been executed in operation sections of a terminal connected to LAN is detected by a PC condition receiving section 111. It is judged that the operation has been executed based on the operation information during a predetermined period X before and after the time when the data are transmitted to WAN. The data received during the predetermined period X are transmitted to WAN as a result of the judging.

15 Claims, 4 Drawing Sheets

DIAL-UP ROUTER AND METHOD OF CONTROLLING OUTGOING OF THE DIAL-UP ROUTER

BACKGROUND OF THE INVENTION

This invention relates to a dial-up router which is for use in constituting a network by connecting a local area network (LAN) with a wide area network (WAN), and also to a method of controlling outgoing of the dial-up router.

Recently, dial-up routers for connecting and relaying local area networks (LAN) with wide area networks (WAN) including a private line, an ISDN, the other public transmission circuit network, and the like by a dial-up connection have come into wide use with the utilization of internet.

Generally, a dial-up router functions to connect or disconnect terminals at LAN side with WAN such as ISDN, or the like as occasion demands. In such a case, a destination address of packet data which has reached the dial-up router from LAN in accordance with communication protocol, such as TCP/IP, or the like is investigated by the dial-up router, as a necessary condition for outgoing. If the destination address is directed to WAN, the dial-up router automatically transmits the packet data to a transmission circuit of WAN.

However, as will later be described more in detail, all packet data except for those having the destination addresses directed to the inner side of the dial-up router (in other words, those directed to LAN) cause the above transmission to WAN. As a result, it is inevitably caused to occur that a user is charged with increased communication fees.

SUMMARY OF THE INVENTION

It is therefore an object of the present invention to provide a dial-up router which is capable of preventing the dial-up router from outgoing It is another object of the present invention to provide a dial-up router and a method of controlling outgoing thereof capable of preventing the dial-up router from outgoing to a wide area network, when a user of a terminal of a local area network leaves the terminal.

It is yet another object of the present invention to provide a dial-up router and a method of controlling outgoing thereof capable of preventing the dial-up router from outgoing to a server of a local area network, even though a terminal of the local area network receives outgoing packet data from the server of the local area network during communication therebetween without carrying out troublesome establishments, such as filtering, or the like.

Other objects of this invention will become clear as The description proceeds.

According to an aspect of this invention, there is provided a dial-up router for use in constituting a network by connecting a local area network (LAN) having a plurality of terminals with a wide area network (WAN) therethrough, the dial-up router comprising: receiving means for receiving data to be transmitted from the LAN to the WAN; detecting means for detecting whether or not operation sections of the a plurality of terminals are used; judging means for judging whether or not the receiving means have received the data for a predetermined period X after the detecting means detected that the operation sections were used; and transmission means for transmitting the data to the WAN when the judging means judges that the receiving means have received the data.

At least one of the a plurality of terminals may be a personal computer, wherein the operation section of the personal computer is a keyboard.

At least one of the a plurality of terminals may be a personal computer, wherein the operation section of the personal computer is a mouse.

The detecting means may detect whether or not the operation sections are used per each of the a plurality of terminals individually.

The judging means may further comprise: measuring means for measuring the predetermined period X per each of the a plurality of terminals individually; and transmission permitting means for permitting transmission by judging whether or not the receiving means have received the data for the predetermined period X per each of the a plurality of terminals individually, the transmission permitting means permitting the transmission means to transmit the data to the WAN when the receiving means have received the data for the predetermined period X per each of the a plurality of terminals individually.

The transmission means transmitting the data to the WAN when the transmission permitting means permit the transmission, wherein the transmission means may also transmit the data to the WAN when the a plurality of terminals are not connected to the WAN.

According to another aspect of this invention, there is provided a method of controlling transmission in a dial-up router for use in constituting a network by connecting a local area network (LAN) having a plurality of terminals with a wide area network (WAN) therethrough, the method comprising the steps of: detecting operation information showing that operation has been executed in operation sections of the a plurality of terminals connected to the LAN when the data to be transmitted from the LAN to the WAN are received; judging that the operation has been executed based on the operation information during a predetermined period X before and after the time when the data are transmitted to the WAN; and transmitting the data received during the predetermined period X to the WAN as a result of the judging.

The predetermined period X being measured from the time when the operation information has been detected, wherein the dial-up router may transmit the data to the WAN if valid data are generated during the measurement and if the data are received while the valid data being generated.

DETAILED DESCRIPTION OF THE PREFERRED EMBODIMENT

Figure 1:
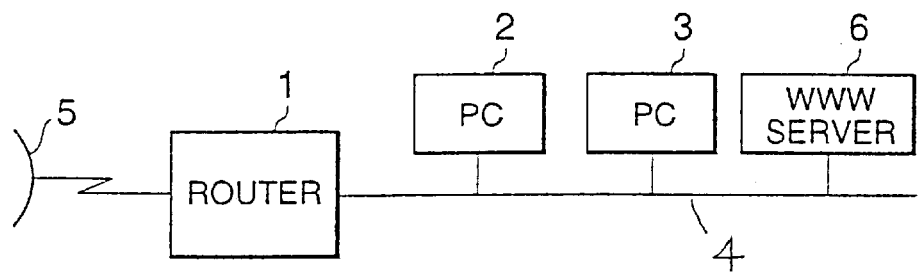
FIG. 1 is a schematic block diagram for showing an example of a network which is constituted by the use of a conventional dial-up router.

Referring to FIG. 1, description is, at first made about a conventional dial-up router in order to facilitate an understanding of the present invention. FIG. 1 is a schematic block diagram for showing an example of a network which is constituted by the use of the conventional dial-up router.

As illustrated in FIG. 1, personal computers (PC) 2 and 3 are connected with LAN 4 while LAN 4 and WAN 5 are connected with each other by a dial-up router 1. In addition, a World Wide Web (WWW) server 6 is connected with LAN 4 in FIG. 1.

As mentioned in the preamble of the instant specification, the dial-up router 1 functions to connect or disconnect terminals at the LAN side (PC 2, 3) with WAN 5, such as ISDN, or the like as occasion demands. In such a case, a destination address of packet data which has reached the dial-up router 1 from LAN 4 in accordance with communication protocol, such as TCP/IP, or the like is investigated by the dial-up router 1, as a necessary condition for outgoing. If the destination address is directed to WAN 5, the dial-up router 1 automatically transmits the packet data to a transmission circuit of WAN 5.

However, all packet data except for those having the destination addresses directed to the inner side of the dial-up router 1 (in other words, those directed to LAN 4) cause the above transmission to WAN 5. As a result, it is inevitably caused to occur that a user is charged with increased communication fees. This problem is hereinunder described more concretely.

For example, in FIG. 1, the dial-up router 1 sometimes transmits the packet data to the transmission circuit of WAN 5, even if a user of PC 2 only opens a home page like the following on a WWW browser.

Namely, when the user of PC 2 is opening to see a top page of a news site provided by the news provider at the WAN 5 side by the WWW browser, the WWW browser obtains re-access to the news site at the WAN 5 side at regular intervals in accordance with an indication of the news site with no relation to operations by the user of PC 2 (operations on a keyboard or on a mouse). As a result, the dial-up router 1 does transmit the packet data to the transmission circuit of WAN 5, although the user of PC 2 takes no action to click on the WWW browser.

Recently, such Web sights are increased. The Web sights are, for example, a news server by a newspaper office, a stock information server for providing stock prices information, and so on. Most of these servers force the user's side to receive and store a program for making transmission from the user's side to the server's side at regular intervals, when the user's side obtains access to the server. Upon receiving the transmission at regular intervals, the server sends incessantly changing new information to the user's side. Some of those servers make such a program in which the regular intervals are not longer than one minute. Further, when the user does not know that the Web sight is such a site, the transmission is automatically carried out. Accordingly, the user is charged with the communication fee unless he closes the WWW browser. In addition, when the user leaves PC 2 for a long time, numbers of transmissions are thereby increased ised. As a result, communication time is also increased. Therefore, it is necessary for the user to finish the WWW browser every time, even if the user stops to see the WWW browser for a short time. This takes plenty of time and brings about a lot of mental fatigue.

While PC 2 in FIG. 1 is connected with WAN 5 through the dial-up router 1, a server 6 sometimes transmits packet data (packet data having URL) for outgoing from a router (not shown in FIG. 1) other than the dial-up router 1 through LAN 4. In this case, if the dial-up router 1 is not subjected to filtering against the news server 6, the dial-up router 1 captures the packet data (packet data having URL) without distinguishing between the packet data and those from PC 2. As a result, the dial-up router 1 cannot help carrying out transmission operation. In this case, the user of PC 2 is charged with unwanted communication fees.

Figure 2:
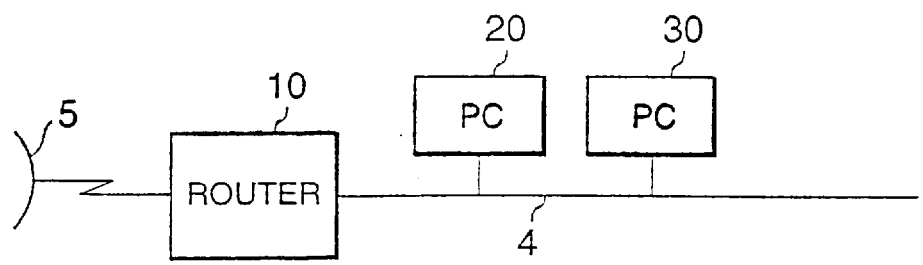
FIG. 2 is a schematic block diagram for showing an example of a network which is constituted by the use of a dial-up router according to a preferred embodiment of the present invention.
Figure 3:
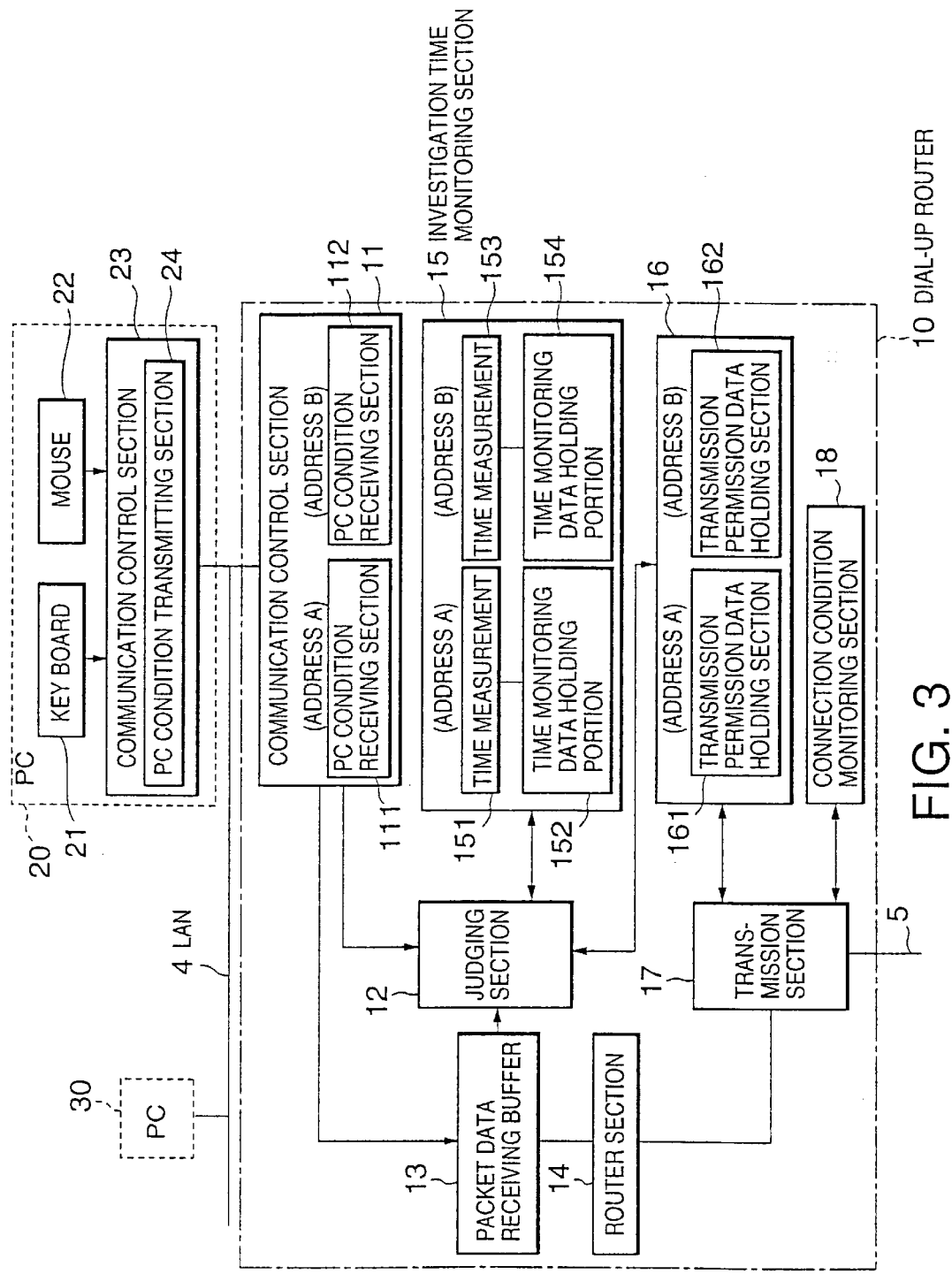
FIG. 3 is a block diagram for showing detailed structures of the dial-up router and the personal computer illustrated in FIG. 2.

Referring now to FIGS. 2 and 3, description will proceed to a dial-up router according to a preferred embodiment of the present invention. FIG. 2 is a schematic block diagram for showing an example of a network which is constituted by the use of the dial-up router according to the preferred embodiment of the present invention.

In FIG. 2, personal computers (PC) 20 and 30 are connected to LAN 4. LAN 4 and WAN 5 are connected with each other by the dial-up router 10 according to the preferred embodiment of the present invention.

LAN 4 is an Ethernet in which a communication protocol, TCP/IP is used. WAN 5 includes, an ISDN, a telephone communication circuit network, a packet exchange network, and the like. In this embodiment, the ISDN is used as WAN 5.

FIG. 3 is a block diagram for showing detailed structures of the dial-up router and the personal computers illustrated in FIG. 2.

The dial-up router 10 judges whether or not transmission is required for sending the packet data to the side of WAN 5 among all the packet data received from LAN 4. As a precondition of the judgement, the dial-up router 10 investigates whether or not data input information of a mouse or a keyboard on PC 20 or PC 30 in LAN 4 is received by "a PC condition receiving section" (will later be described) of the dial-up router 10. On the other hand, PC 20 and PC 30 respectively have a PC condition transmitting section" for transmitting the condition of PC 20 or PC 30 itself to the dial-up router 10. If it is judged that the data input information of a mouse or E* keyboard of the packet data has been received, the dial-up router 10 decided that the received packet data are such packet data as that produced by an actual operation of a user. As a result of this decision, the dial-up router 10 transmits the packet data to the ISDN.

Next, referring to FIG. 3, description is concretely made as regards the constitutions of PC and the dial-up router 10.

In IP protocol on LAN 4, a destination address and a source address are included in the packet together with data, so that the packet data are transmitted/received in an Ethernet. Herein, description is made about such a case, as an example.

(Constitutions of PC 20, 30)

As illustrated in FIG. 3, PC 20 (PC 30 is similar to PC 20) includes a keyboard 21, a mouse 22, and a communication control section 23. In addition to the keyboard 21, the mouse 22, and the communication control section 23, PC 20 bas computer processing circuits, such as an ROM, an RAM, a central processing unit, and the like, and a display, or the like, illustration of which is omitted in FIG. 3.

The communication control section 23 executes communication control (control of Layer 1 and Layer 2) for LAN consisting of Ethernet and communication control (control of Layer 3 and Layer 4) for carrying out TCP/IP. Further, the communication control section 23 has a PC condition transmitting section 24 for informing the dial-up router 10 of a condition of using PC by a user. As information for recognizing the condition of using PC by a user (using condition data), considered are such information when the user pushes an Enter key of the keyboard 21, information when the user clicks the mouse 22, and the like. Alternatively, condition of using PC can be recognized by an operation of the other keys, an input operation of specific characters, and detection of operation of mouse. The information for condition of using PC are included in the packet data, as an event attribute.

If the using condition data (the event attribute) are generated in the PC condition transmitting section 24, the using condition data (the event attribute) are captured into the packet data by TCP/IP and then transmitted to LAN 4.

It is hereinunder assumed that the source address (IP address) generated in the communication control section 23 of PC 20 is an address A and that the source address (IP address) generated in a communication control section (not shown) of PC 30 is an address B.

(Constitutions of the dial-up router 10)

The dial-up router 10 comprises a communication control section 11 for carrying out TCP/IP with an Ethernet, a judging section 12 for performing various judgements for transmission regulation, a packet data receiving buffer 13, a router section 14 which is the heart for performing routing, an investigation time monitoring section 15, a transmission permission data holding section 16, a transmission section 17, and a connection condition monitoring section 18.

Besides, transmission circuits for transmitting data from LAN 4 to WAN 5 are mainly depicted in the dial-up router 10 of FIG. 3. However, the dial-up router 10 has also reception circuits for receiving data from WAN 5 to LAN 4, illustration almost of which is omitted in FIG. 3.

The communication control section 11 executes data communication on LAN in accordance with communication protocol of Ethernet and TCP/IP to transmit and receive the packet data. Further, the communication control section 11 has a PC condition receiving section for receiving the using condition data (data from the PC condition transmitting section 24) per each source address. The using condition data are, as mentioned above, such data for recognizing an existence of a person, for example, operation of a keyboard or a mouse of PC on LAN. Accordingly PC condition receiving sections 111, 112 are provided in correspondence to the addresses A, B, respectively, as illustrated in FIG. 3.

Upon receiving the using condition data, the PC condition receiving sections 111, 112 inform the judging section 12 of that fact, respectively. In addition, the PC condition receiving sections 111, 112 also send "source address" and "reception data attribute" to the judging section 12, respectively, when informing the judging section 12 that they have received the using condition data.

In the "reception data attribute", included are information (event attribute) capable of recognizing whether it is a keyboard or a mouse that a user operates on PC of the source address, or whether or not a key for a specific character is pushed on a keyboard, and so on. Since the dial-up router 10 according to this embodiment supports TCP/IP protocol, IP address, Mac address, or the like is used as "destination address".

Upon receiving "notification" of information from the PC condition receiving sections 111, 112 or the packet data receiving buffer 13, the judging section 12 has a function to send "judgement" and "requirement" to the other sections.

When the PC condition receiving sections 111, 112 receive data from the PC condition transmitting section 24 and the event thereof is sent to the judging section 12, the investigation time monitoring section 15 starts measurement of time up to the time X which is a time-up period predetermined by a user. The investigation time monitoring section 15 also sets and clears the measurement time. The time X which is measured by a time measurement section 151 is, for example, several seconds at the most.

Information for which the investigation time monitoring section 15 receives "notification" from the judging section 12 are "time measurement requirement" and "source address". The investigation time monitoring section 15 not only receives these informations but also monitors the measurement time.

As illustrated in FIG. 3, the investigation time monitoring section 15 comprises time measurement sections 151, 153 for measuring the time X per source address, and time monitoring data holding sections 152, 154.

The time monitoring data holding sections 152, 154 records information for showing this as "valid", while the time measurement sections 151, 153 are measuring the time X. On the contrary, the time monitoring data holding sections 152, 154 records information for showing this as "invalid" on the other occasions. The time monitoring data holding sections 152, 154 are controlled in relation to information of source address.

The packet data receiving buffer 13 receives packet data including the source address received and abstracted by the communication control section 11. The packet data receiving buffer 13 then stores the packet data. In the time of outgoing packet data generated by input of URL in WWW browser, and so on are received by the packet data receiving buffer 13. The received and stored packet data are transmitted to the router section 14 having a routing function.

In addition, the packet data receiving buffer 13 gives "notification" to the judging section 12 together with the "source address", when the packet data receiving buffer 13 received the packet data.

Upon receiving "notification" from the packet data receiving buffer 13, the judging section 12 refers whether the time monitoring data holding sections 152, 154 shows "valid" or "invalid". The judging section 12 sends the result ("valid" or "invalid") to the transmission permission data holding section 16 together with the "source address". The transmission permission data holding section 16 receives the result ("valid" or "invalid") together with the "source address" from the judging section 12. The transmission permission data holding section 16 then stores the result ("valid" or "invalid") per each "source address" in the transmission permission data holding portions 161, 162.

The router section 14 has a function to investigate a destination address of the received packet data and then send the received packet data to an appropriate outlet, similarly to the heart of a general router. Then, the router section 14 sends "transmission requirement" to the transmission section 17 together with "source address", when a destination of the received packet data is directed to the side of WAN 5.

With reference to the transmission permission data holding section 16 and the connection condition monitoring section 18, the transmission section 17 judges whether or not transmission should be performed in accordance with "transmission requirement" from the router section 14. In this preferred embodiment, since WAN 5 is an ISDN, the transmission section 17 has a function to transmit the packet data to the ISDN. Further, the transmission section 17 has a function to communicate with the ISDN.

The connection condition monitoring section 18 is such a section in which connection conditions of circuits of the dial-up router 10 according to this embodiment are stored.

Figure 4:
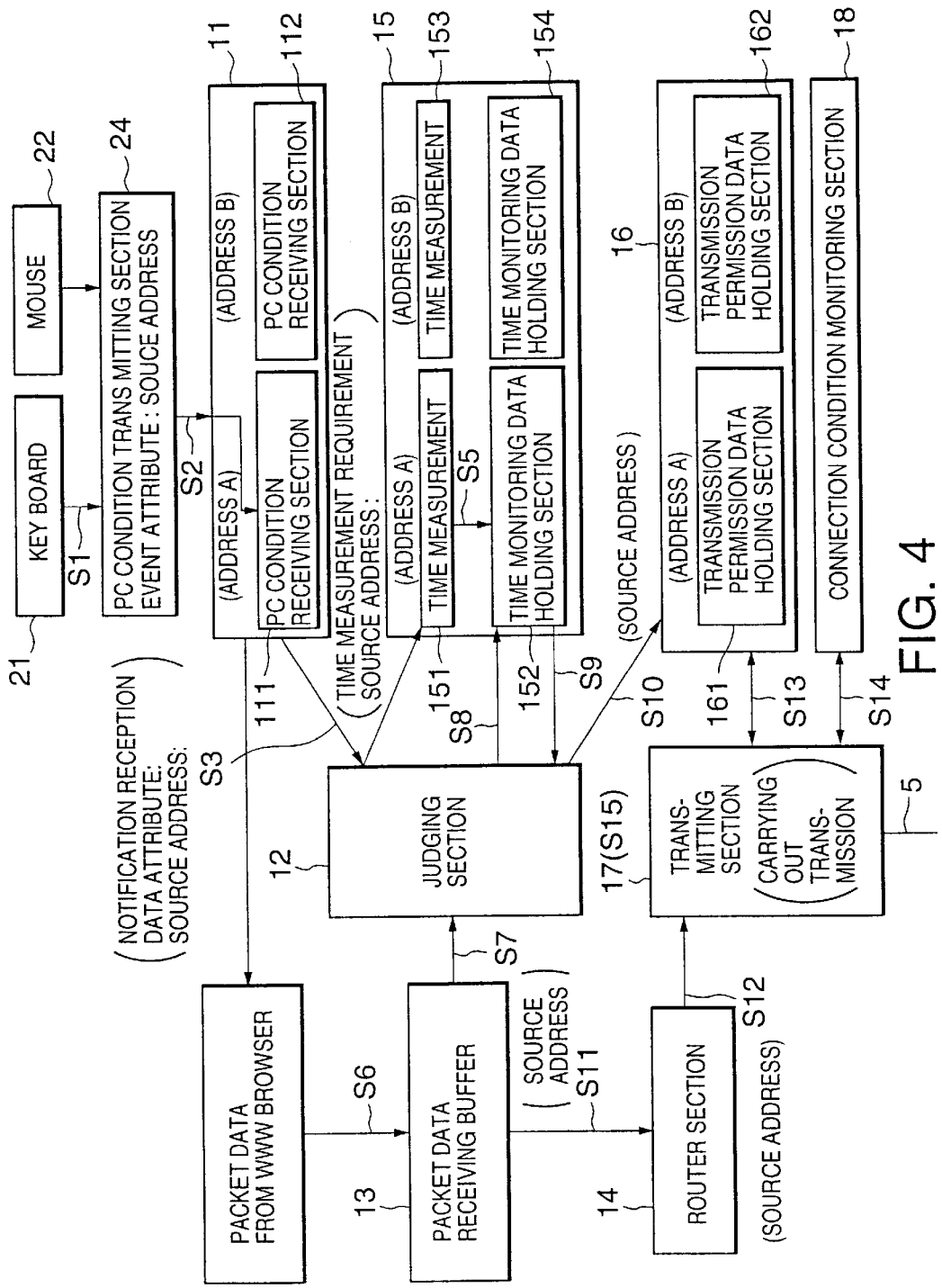
FIG. 4 is a block diagram for showing operations of the dial-up router and the personal computer illustrated in FIG. 3.

Next, referring to FIG. 4, description will proceed to an operation of the dial-up router 10 according to this embodiment. FIG. 4 is a block diagram for explaining a flow of operations of the dial-up router 10 and PC 20 in the network illustrated in FIG. 3. In FIG. 4, actions S1 through S14 are shown by the arrow marks.

(Action S1)

At first, a user pushes a return key on the PC 20 with indicating URL in the WWW browser. As a result, the PC condition transmitting section 24 sends the fact that the return key of the keyboard 21 is pushed to the dial-up router 10 together with "event attribute" and "source address". Herein, "event attribute" informs the dial-up router 10 what types of persons input the return key while "source address" informs the dial-up router 10 which PC produce the event.

(Action S2)

Accordingly, the "event attribute" and the "source address" are transmitted to the PC condition receiving sections 111 in the communication control section 11 of the dial-up router 10.

(Action S3)

Upon receiving the "event attribute" and the "source address", the PC condition receiving sections 111 informs the Judging section 12 of the fact together with "reception data attribute" and "source address". Herein, the "reception data attribute" corresponds to the "event attribute" received from a terminal.

(Action S4)

The judging section 12 recognizes that the data have been input to the PC condition receiving sections 111. As a result, the judging section 12 requires the investigation time monitoring section 15 to start measurement of time with sending the "source address" to the investigation time monitoring section 15.

(Action S5)

The investigation time monitoring section 15 clears the source address in the time monitoring data holding sections 152. The investigation time monitoring section 15 newly changes "invalid" into "valid" in the time monitoring data holding sections 152. The investigation time monitoring section 15 starts the measurement of time in the time measurement section 151. This measurement is to be counted up to a certain predetermined time X. Thereafter, when counting reaches the predetermined time X, the measurement for this source address is automatically finished. At the same time, the time monitoring data holding sections 152 is cleared. Preferably, the predetermined time X can be readily varied, dependent on a circumstance in which the dial-up router 10 is used.

(Action S6)

The information sent from the PC condition transmitting section of PC 20 reaches the PC condition receiving sections 111. On the other hands also packet data of the actual URL are transmitted from PC together. The packet data are received by the communication control section 11. The packet data are then sent from the communication control section 11 to the packet data receiving buffer 13.

(Action S7)

The packet data are input to the packet data receiving buffer 13 from PC 20, the packet data receiving buffer 13 informs the judging section 12 of the fact together with the "source address".

(Action S8)

The judging section 12 investigates a condition of the time monitoring data holding sections 152 as regards the source of the packet data based on the informed "source address" (Address A).

(Action S9: Action S10)

If a condition of the time monitoring data holding sections 152 is the "valid" showing that time is monitored during the time X (Action S9), the judging section 12 controls the transmission permission data holding portions 161 regarding the address A to change "transmission permission data" from "invalid" into "valid" in relation to "source address". Herein, the "transmission permission data" shows that transmission by a trigger of the packet data is permitted.

(Action S11)

On the other hand, the router section 14 receives packet data through the packet data receiving buffer 13.

(Action S12)

The router section 14 investigates whether or not the data should be sent to the side of WAN. When the router section 14 decided that the data should be sent to the side of WAN, the router section 14 outputs "transmission requirement" to the transmission section 17.

(Action S13)

Before starting transmission operation for transmitting the packet data, the transmission section 17 refers the transmission permission data holding portions 161 regarding the address A. In this time, the transmission section 17 adds a condition that data of the transmission permission data holding portions 161 have become "valid" as a condition for transmitting the data to a circuit network.

(Action S14)

In addition to the condition for transmitting the data in the Action S13, the connection condition monitoring section 18 investigates connection conditions of the circuit at the present regarding a destination to which the circuit is connected and a network address thereof, similarly to a general dial-up router.

(Action S15)

The transmission Section 17 judges whether not only the condition of the Action S13 but also the condition of the Action S14 have been achieved or not. As a result of the monitoring of the connection condition by the connection condition monitoring section 18, it is recognized that connection of a circuit has been completed as regards a destination of connection to which transmission is to be performed from now on. In this case, the transmission section 17 would be succeeded in the transmission of the packet data without performing a new transmission operation. On the contrary, if the transmission to the ISDN of WAN 5 has not been completed, the dial-up router 10 carries out transmission to the ISDN to perform the connection of the circuits. After the connection of the circuits, transmission data within the packet data are transmitted to the ISDN constituting WAN 5.

In the operations described above, when the WWW browser is opened in PC 20, the PC 20 sends packet data for driving transmission including the using condition data and URL to LAN 4 by pushing the return key of the keyboard 21 or clicking the mouse 22 of the PC 20 after inputting the URL if the transmission to WAN is required. As a result, the dial-up router 10 receives the using condition data by the PC condition receiving sections 111. The dial-up router 10 then renders the time monitoring data holding sections 152 to be valid. Further, when the source address is detected within the packet data including URL received from PC 20 the dial-up router 10 judges whether or not a content of the time monitoring data holding section regarding the source address is valid. If the content of the time monitoring data holding section regarding the source address is valid, the dial-up router 10 permits the transmission. When such a transmission permission condition is thus kept in the transmission section 17, the transmission section 17 carries out transmission of the received packet data.

In the operations described above, when the packet data are input to the packet data receiving buffer 13 in the Action S7, the packet data receiving buffer 13 informs the judging section 12 of the fact together with the source address. In a case that the time X has already passed in the time measurement section 151 when the information of the fact reaches the judging section 12, the content of the time monitoring data holding section 152 has changed from "valid" into "invalid".

Then, in the Action S9 and Action S10, it is recognized that the content of the time monitoring data holding section 152 has changed from "valid" into "invalid", since the time X has already passed. Consequently. "transmission permission data" remain unchanged to be kept at "invalid" regarding the "source address" in the transmission permission data holding portions 161.

Thus, in a case that the judging section 12 did not know that the packet data reached the packet data receiving buffer 13 during the predetermined period X, the transmission section 17 does not actually carry out the transmission of the received packet data.

An operation for transmission by PC 30 is similar to the operation by PC 20 mentioned above. However, the source address is not address A but address B. Accordingly, the time measurement section 153 and the time monitoring data holding section 154 regarding the address B are operable in the investigation time monitoring section 15. On the other hand, the transmission permission data holding portion 162 is operable in the transmission permission data holding section 16.

The preferred embodiment of the present invention can advantageously solve the problem that transmission is carried out only by a user's opening the following home page on the WWW browser.

For example, PC 20, at first, obtains an access to a news server or a stock information server (not shown) at the WAN 5 side through the dial-up router 10. PC 20 then receives programs required for transmitting/receiving packet data from the news server or the stock information server to be stored in PC 20. It is assumed that the programs contain a program for making transmission from the PC 20 to the server at regular intervals.

According to the conventional dial-up router, in this case, when the user of PC 20 is opening to see a top page of a news sight provided by the news provider at the WAN 5 side by the WWW browser, the WWW browser obtains re-access to the news sight at the WAN 5 side at regular intervals in accordance with an indication of the news sight with no relation to operations by the user of PC 20. As a result, the conventional dial-up router does transmit the packet data to the transmission circuit of WAN 5, although the user of PC 20 takes no action to click on the WWW browser.

However, according to the dial-up router 10 of the preferred embodiment of the present invention, in that case, the user of PC 20 reading the news sight pushes the return key on the keyboard after inputting URL on the WWW browser. When the URL data reach the dial-up router 10 during the predetermined time X, the dial-up router 10 judges that a condition for transmission has been achieved, so that the dial-up router 10 proceeds to an actual transmission operation. Therefore, the dial-up router 10 can proceed to a transmission operation at the timing that the user of PC 20 desires the transmission. Accordingly, needless transmission for the user can be drastically decreased.

Further, according to the dial-up router 10 of the preferred embodiment of the present invention, the following advantageous effect is also obtained. Namely, while PC 20 is connected with WAN 5 through the dial-up router 10, a server on LAN 4 (equal to the server 6 in FIG. 5) sometimes transmits packet data (packet data having URL) for outgoing from a router (not shown) other than the dial-up router 10 through LAN 4. However, transmission is never carried out, unless using condition data regarding the server 6 are received by the dial-up router 10 to become valid data in the time monitoring data holding section. As a result, according to the dial-up router 10 of the preferred embodiment of the present invention, needless transmission can be decreased without difficult setting, such as a filtering, and the like.

In addition, different users usually use a PC connected to LAN 4. A PC may be such a server as regularly exchanging news group data with a news server provided by an external provider by the use of NNTP protocol. On the other hand, in another PC, a user may obtain access to Internet by WWW browser, mailer, ftp tool, and so on through operations of a mouse or a keyboard.

According to the dial-up router 10 of the preferred embodiment of the present invention, the transmission permission data holding section 16 is controlled by respective PC source address. The transmission permission data holding section 16 is always kept "valid" as regards the former PC which transmits packet data having no relation to operations of keyboard, or the like, by the user. On the contrary, the transmission permission data holding section 16 can be adjusted to vary in cooperation with a related module as regards the latter PC. Accordingly, it is possible to give a suitable operation for each PC in the preferred embodiment of the present invention. Thus, the dial-up router 10 according to the preferred embodiment can be suitable for a wide variation of use. In this case, functions similar to those of a general router can be provided by setting a general filtering on the router section 14 of the dial-up router 10.

Further, when the dial-up router 10 receives packet data which should be transmitted from a PC having IP address C to WAN 5, the dial-up router 10 receives a notification including the source address (address C) by the judging section 12 after receiving the packet data by the packet data receiving buffer 13. Then, in a cast that the time monitoring data holding section corresponding to the address C exists in the investigation time monitoring section 15 and that data stored in the time monitoring data holding section are always valid, packet data having the source address C can be transmitted despite of using conditions of a keyboard or a mouse of the PC. Accordingly, transmission control can be executed more freely according to the dial-up router 10 of the preferred embodiment of the present invention.

As described above, according to the present invention, the dial-up router judges whether or not transmission is required for sending the packet data to the side of WAN among all the packet data received from LAN. As a precondition of the judgement, the dial-up router investigates whether or not data input information of a mouse or a keyboard on PC in LAN is received during a certain predetermined period X before and after the transmission from LAN. If it is judged that the data input information of a mouse or a keyboard from the source of the packet data has been received, the dial-up router decided that the received packet data are such packet data as produced by an actual operation of a user. As a result of decision the dial-up router transmits the packet data to the WAN.

Accordingly, the following advantageous effect can be obtained according to the present invention, although it cannot be obtained by setting a filtering like a general router.

Namely, even if a user of a terminal of LAN generates packet data to be automatically transmitted to WAN without operating the terminal and the dial-up router receives the generated packet data, the dial-up router never transmit the received packet data unless operation of the terminal is confirmed. As a result, it becomes possible that transmission taking a needless charge is prevented.

While the present invention has thus far been described in conjunction with only a preferred embodiment thereof, it will be readily understood for those skilled in the art to put the present invention into various other manners.

For example, the communication protocol of LAN 4 was TCP/IP in the preferred embodiment mentioned above. It may be NetBUEI protocol standardly provided by Windows 95 of Microsoft, Corporation, LTD. In this case, as the source address used in each Action S2, S3, S4, S7, and S10 through S14 in FIG. 4, names of computers of the source of transmission are used alternatively. Furthermore, the other communication protocols may be used. In these cases, format of the data received from LAN may be such ones other than packet data.

Figure 5:
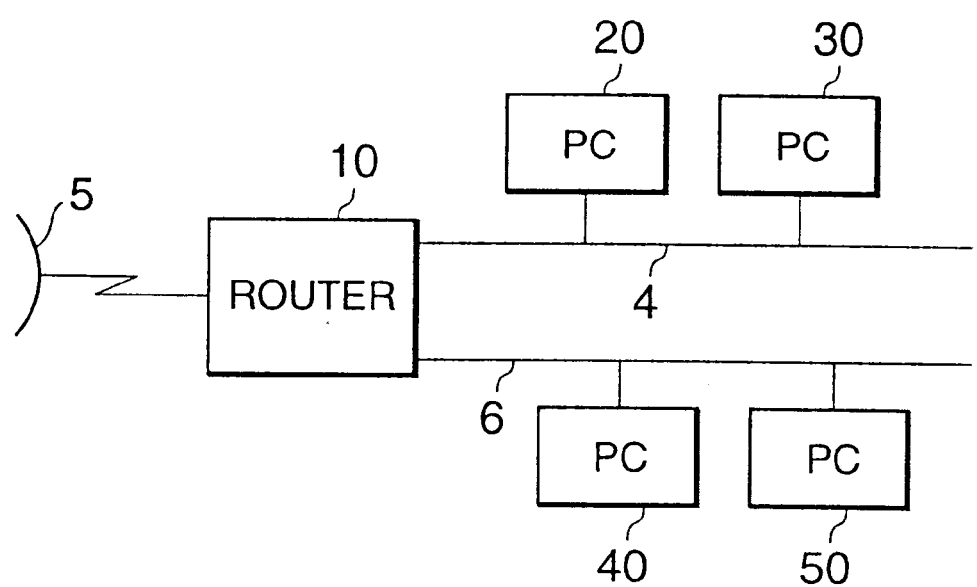
FIG. 5 is a schematic block diagram for showing another example of a network which is constituted by the use of a dial-up router according to the preferred embodiment of the present invention.

Moreover, as illustrated in FIG. 5, not only LAN 4 but also LAN 6 may be connected to the dial-up router 10. In this case, a circuit similar to that of FIG. 3 may be provided in parallel per each LAN as the dial-up router 10.

What is claimed is:

1. A dial-up router for use in constituting a network by connecting a local area network (LAN) having a plurality of terminals with a wide area network (WAN) therethrough said dial-up router comprising:

receiving means for receiving data to be transmitted from said LAN to said WAN;

detecting means for detecting whether or not operation sections of said plurality of terminals are used;

judging means for judging whether or not said receiving means have received said data during a predetermined period X after said detecting means detected that said operation sections were used; and transmission means for transmitting said data to said WAN when said judging means judges that said receiving means have received said data.

2. A dial-up router as claimed in claim 1, at least one of said plurality of terminals being a personal computer, wherein the operation section of said personal computer is a keyboard.

3. A dial-up router as claimed in claim 1, at least one of said plurality of terminals being a personal computer, wherein the operation section of said personal computer is a mouse.

4. A dial-up router as claimed in claim 1, wherein said detecting means detect whether or not said operation sections are used for each of said plurality of terminals individually.

5. A dial-up router as claimed in claim 4, wherein said judging means further comprise:

measuring means for measuring said predetermined period X for each of said plurality of terminals individually; and transmission permitting means for permitting transmission by judging whether or not said receiving means have received said data for said predetermined period X for each of said plurality of terminals individually, said transmission permitting means permitting said transmission means to transmit said data to said WAN when said receiving means have received said data for said predetermined period X for each of said plurality of terminals individually.

6. A dial-up router as claimed in claim 5, said transmission means transmitting said data to said WAN when said transmission permitting means permit said transmission, wherein said transmission means also transmit said data to said WAN when said plurality of terminals are not connected to said WAN.

7. A method of controlling transmission in a dial-up router for use in constituting a network by connecting a local area network (LAN) having a plurality of terminals with a wide area network (WAN) therethrough, said method comprising the steps of detecting operation information showing that operation has been executed in operation sections of said plurality of terminals connected to said LAN when said data to be transmitted from said LAN to said WAN are received;

judging that said operation has been executed based on said operation information during a predetermined period X before and after the time when said data are transmitted to said WAN; and transmitting said data received during said predetermined period X to said WAN as a result of said judging.

8. A method as claimed in claim 7, said predetermined period X being measured from the time when said operation information has been detected, wherein said dial-up router transmits said data to said WAN if valid data are generated during the measurement and if said data are received while said valid data being generated.

9. A dial-up router for use in constituting a network by connecting a local area network (LAN) having a plurality of terminals with a wide area network (WAN) therethrough said dial-up router comprising:

a receiving device for receiving data to be transmitted from said LAN to said WAN;

a detecting device for detecting whether or not operation sections of said plurality of terminals are used;

a judging device for judging whether or not said receiving device has received said data during a predetermined period X after said detecting deice detected that said operation sections were used; and a transmission device for transmitting said data to said WAN only when said judging device judges that said receiving device has received said data during said predetermined period.

10. A dial-up router as claimed in claim 9, at least one of said plurality of terminals being a personal computer, wherein the operation section of said personal computer comprises a keyboard.

11. A dial-up router as claimed in claim 9, at least one of said plurality of terminals being a personal computer, wherein the operation section of said personal computer comprises a mouse.

12. A dial-up router as claimed in claim 9, wherein said detecting device detect whether or not said operation sections are used for each of said plurality of terminals individually.

13. A dial-up router as claimed in claim 12, wherein said judging device further comprise:

a measuring device for measuring said predetermined period X for each of said plurality of terminals individually; and a transmission permitting device for permitting transmission by judging whether or not said receiving device has received said data during said predetermined period X for each of said plurality of terminals individually, said transmission permitting device permitting said transmission device to transmit said data to said WAN when said receiving device has received said data for said predetermined period X for each of said plurality of terminals individually.

14. A dial-up router as claimed in claim 13, said transmission device transmitting said data to said WAN when said transmission permitting device permits said transmission, wherein said transmission device also transmit said data to said WAN when said plurality of terminals are not connected to said WAN.

15. A method of controlling transmission in a dial-up router for use in constituting a network by connecting a local area network (LAN) having a plurality of terminals with a wide area network (WAN) therethrough, said method comprising the steps of detecting operation information showing that operation has been executed in operation sections of said plurality of terminals connected to said LAN when said data to be transmitted from said LAN to said WAN are received;

judging that said operation has been executed based on said operation information during a predetermined period X before and after the time when said data to be transmitted to said WAN are received; and transmitting said data to said WAN as a result of said judging only if it is judged that said operation has been examined during said predetermined time period.

* * * * *